United States Patent

Mukaihira et al.

[11] Patent Number: 5,400,592
[45] Date of Patent: Mar. 28, 1995

[54] DIAGNOSTIC APPARATUS FOR CATALYTIC CONVERTER OF AN INTERNAL COMBUSTION ENGINE

[75] Inventors: Takashi Mukaihira, Katsuta; Toshio Ishii, Mito; Yutaka Takaku, Katsuta; Akihito Numata, Urizura, all of Japan

[73] Assignee: Hitachi, Ltd., Japan

[21] Appl. No.: 194,590

[22] Filed: Feb. 10, 1994

[30] Foreign Application Priority Data

Feb. 12, 1993 [JP] Japan .................. 5-024163

[51] Int. Cl.$^6$ .............................................. F01N 3/20
[52] U.S. Cl. ................................. 60/274; 60/276; 60/277; 60/285; 123/674; 123/703
[58] Field of Search ................... 60/274, 276, 277, 285; 123/674, 703

[56] References Cited

U.S. PATENT DOCUMENTS

| | | | |
|---|---|---|---|
| 4,884,066 | 11/1989 | Miyate | 60/276 |
| 5,074,113 | 12/1991 | Matsuoka | 60/285 |
| 5,090,199 | 2/1992 | Ikuta | 60/276 |
| 5,097,700 | 3/1992 | Nakane | 60/277 |
| 5,271,223 | 12/1993 | Hoshi | 60/276 |
| 5,335,493 | 8/1994 | Uchida | 60/274 |
| 5,337,556 | 8/1994 | Aihara | 60/276 |
| 5,337,557 | 8/1994 | Toyoda | 60/285 |

FOREIGN PATENT DOCUMENTS

2-30915  1/1990  Japan .

*Primary Examiner*—Ira S. Lazarus
*Assistant Examiner*—Daniel J. O'Connor
*Attorney, Agent, or Firm*—Evenson, McKeown, Edwards & Lenahan

[57] ABSTRACT

A catalytic diagnostic apparatus for determining whether a catalyst of an internal combustion engine has deteriorated as disclosed. Air-fuel ratio sensors are placed at the upstream and downstream sides of the catalytic converter, and the output signal from the upstream air-fuel sensor is used to control the air-fuel mixture provided to the engine via the fuel injectors, in a conventional closed loop operation. Diagnosis of the condition of the catalytic converter is performed only when selected engine operating parameters fall within a predetermined diagnostic range. When the engine is operated in the diagnostic range, the condition of the catalytic converter is analyzed by calculating a deterioration index based on a comparison of the variation of the output signals from the upstream and downstream air-fuel ratio sensors. In a preferred embodiment, a look-up table is provided to correct the deterioration index, based on the intake air flow rate to the engine, and on the cyclic frequency of the variation of the downstream air-fuel ratio sensor.

33 Claims, 15 Drawing Sheets

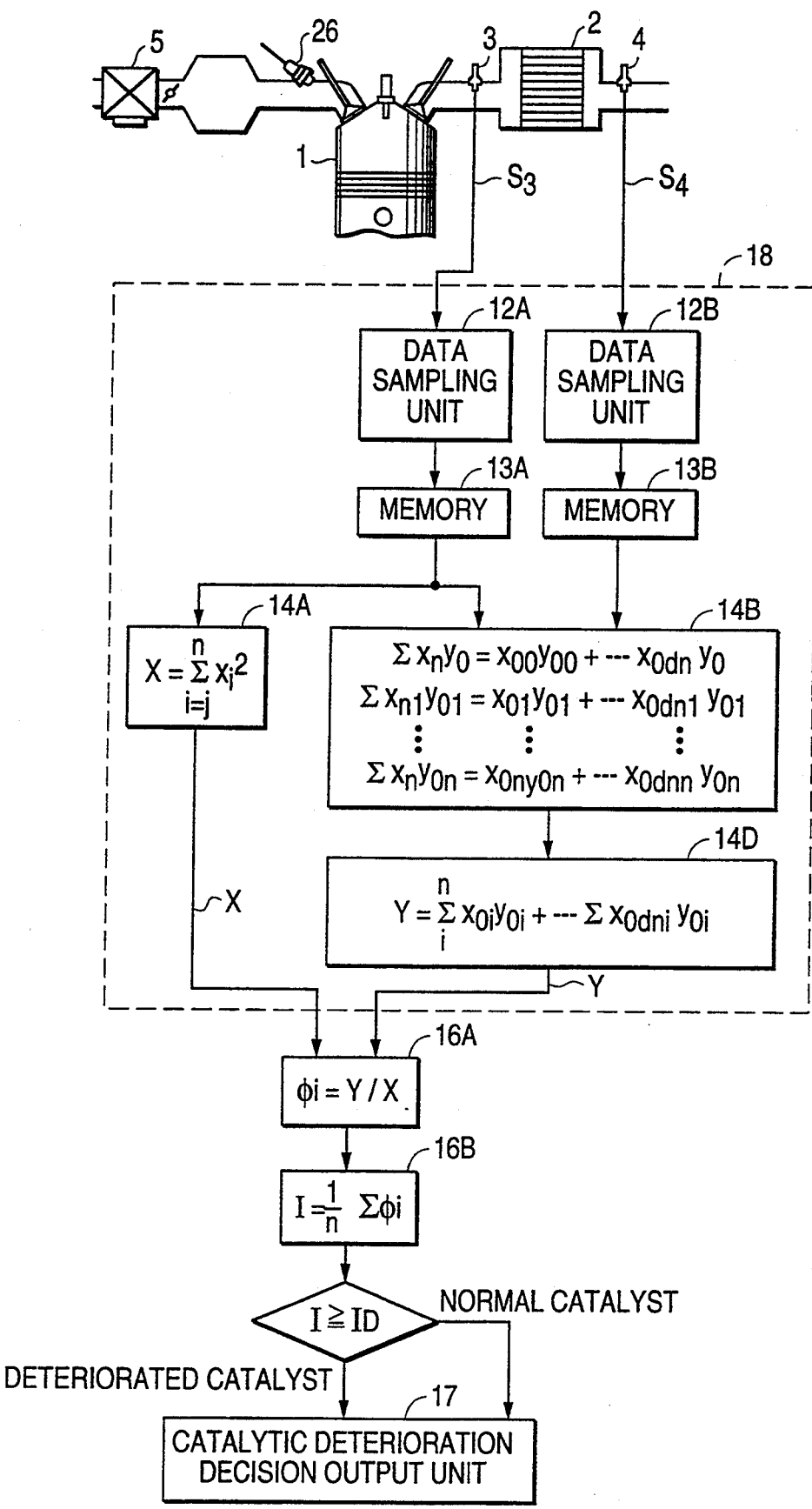

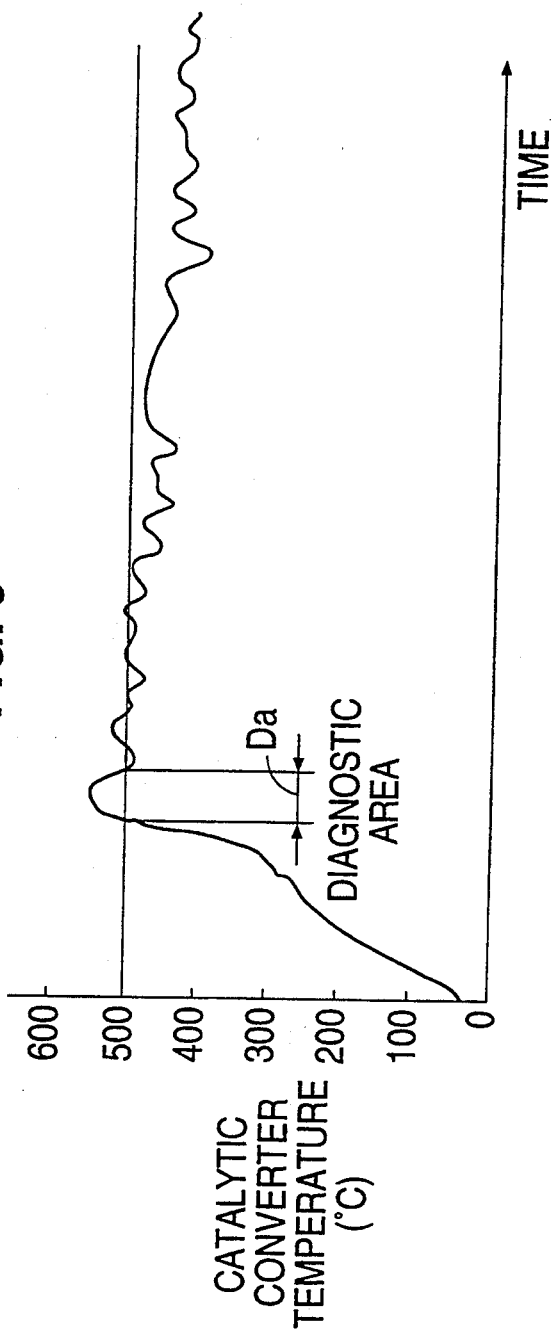

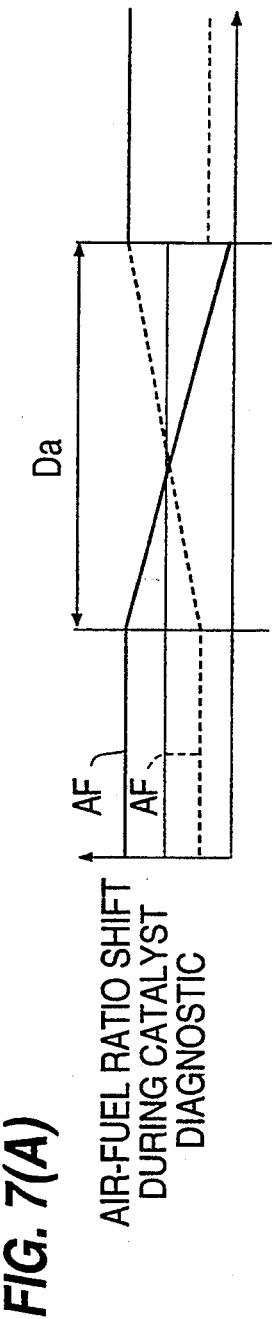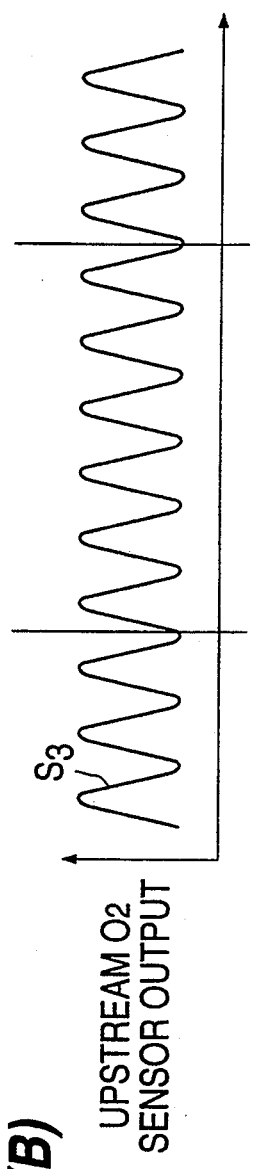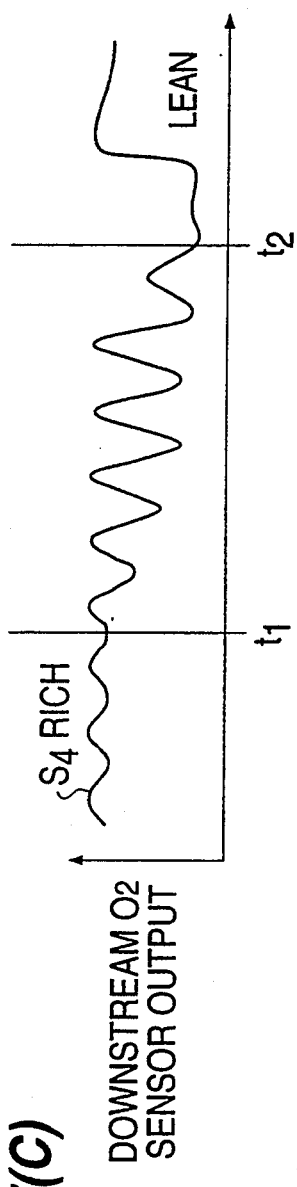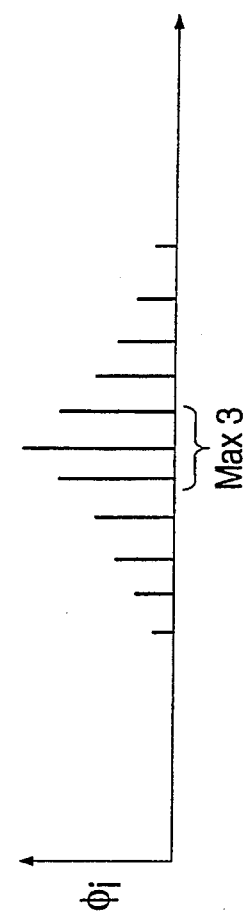
FIG. 7(A) AIR-FUEL RATIO SHIFT DURING CATALYST DIAGNOSTIC
FIG. 7(B) UPSTREAM O2 SENSOR OUTPUT
FIG. 7(C) DOWNSTREAM O2 SENSOR OUTPUT
FIG. 7(D)

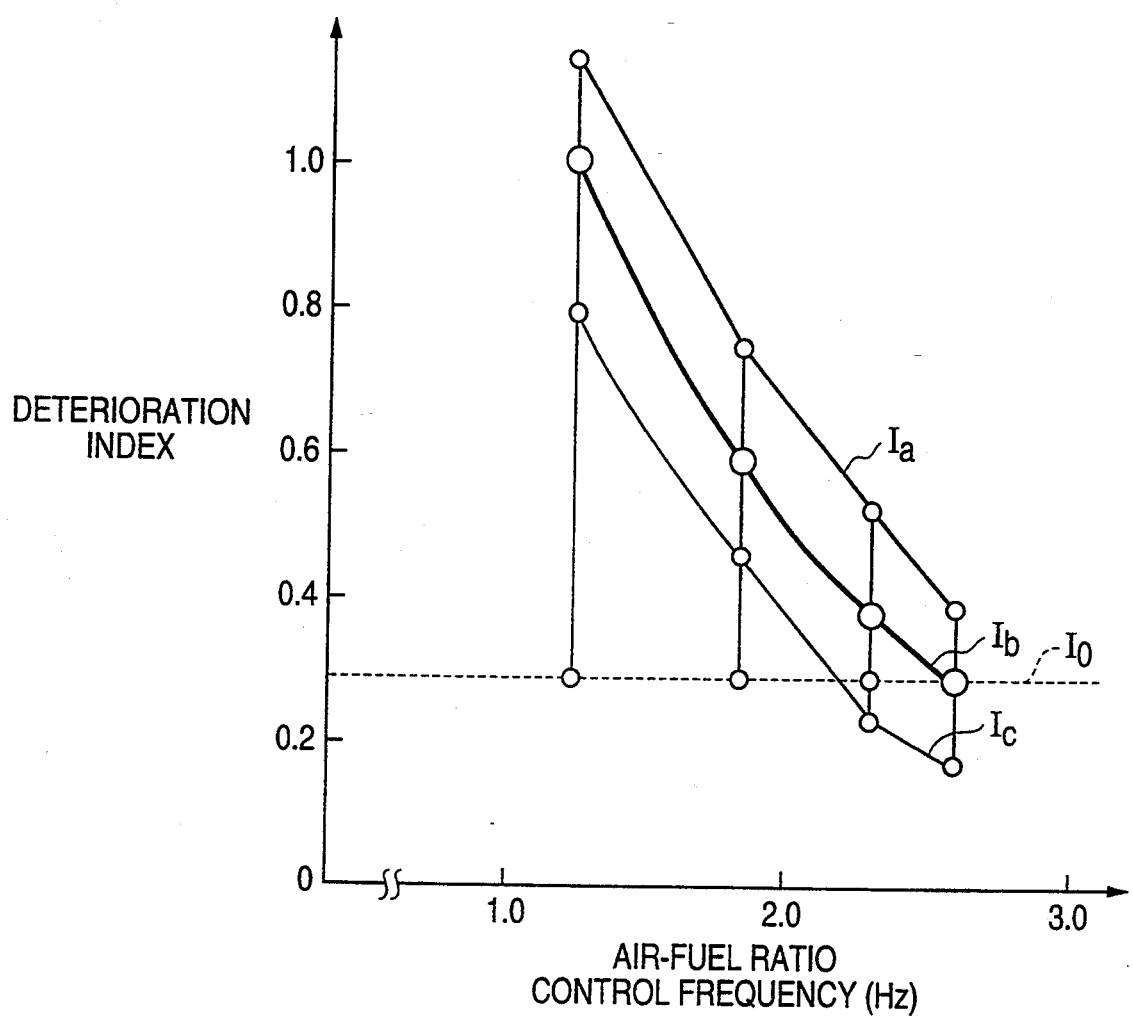

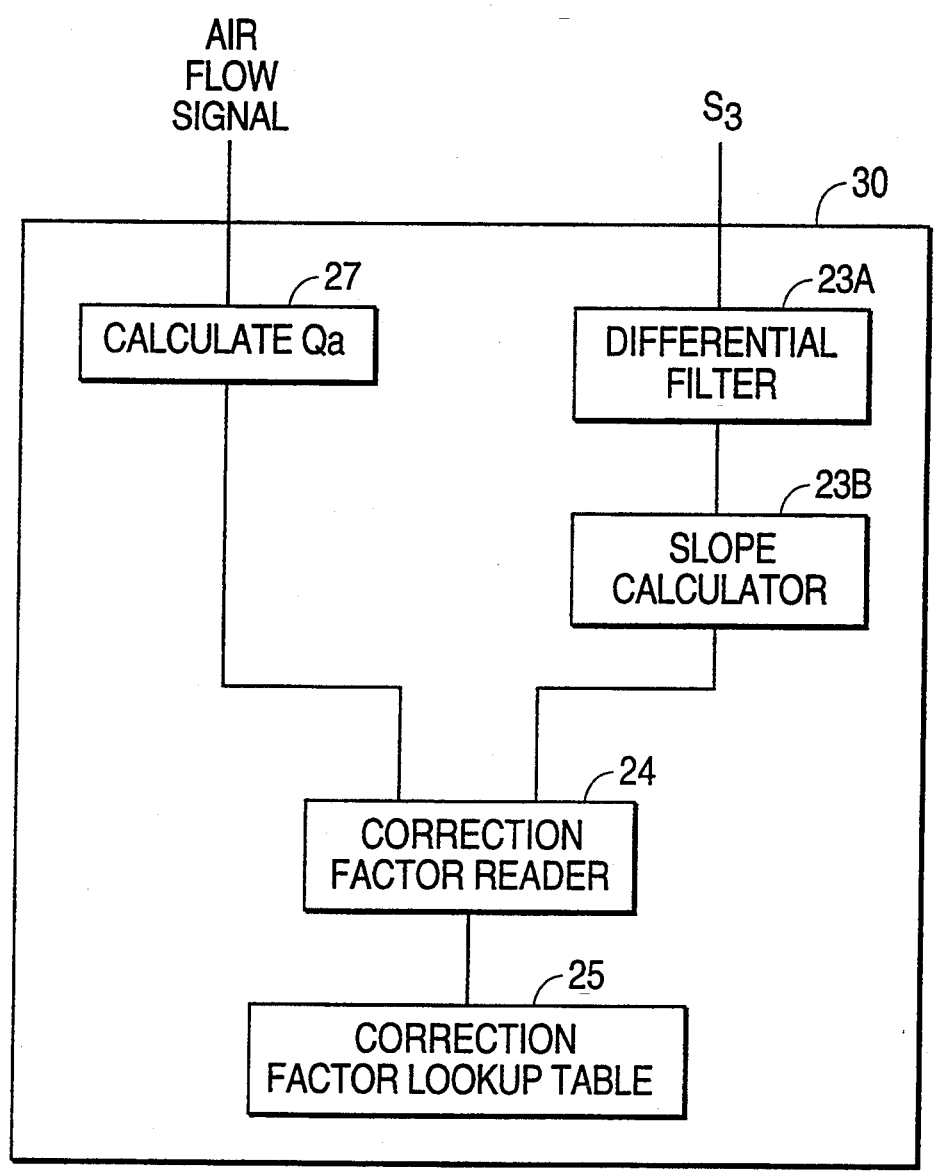

DIAGNOSTIC APPARATUS FOR CATALYTIC CONVERTER OF AN INTERNAL COMBUSTION ENGINE

BACKGROUND OF THE INVENTION

The present invention relates to a diagnostic apparatus for determining whether a catalyst of an internal combustion engine has deteriorated.

The principal components of a system for cleaning exhaust gases of an internal combustion engine are a catalytic converter and an air-fuel ratio feedback control unit. The catalytic converter is coupled to an exhaust pipe for use in removing pollutants such as HC, NOx and CO contained in the exhaust gases. The air-fuel ratio feedback control unit includes an $O_2$ sensor (oxygen sensor) which is arranged on the upstream side of the catalytic converter and used for detecting an air-fuel ratio. In other words, the quantity of fuel injected to such an internal combustion engine is controlled so that the air-fuel ratio may have a predetermined (stoichiometric) value, thus enabling the engine to operate with optimum efficiency and to output the minimum amount of pollutants.

The efficiency of a conventional three-dimensional catalytic system in converting noxious components decreases as the performance of the catalytic converter itself deteriorates, even though the air-fuel ratio is precisely controlled by the air-fuel ratio feedback control unit. Therefore in order to prevent a degradation of the efficiency of the air cleaner system, it is necessary to monitor the condition of the catalytic converter so as to issue a warning when it has deteriorated. Japanese Patent Laid-Open No. 30915/1990, for example, discloses an apparatus for detecting the deterioration of a catalytic converter, entitled "Catalytic Deterioration Decision Apparatus for Internal Combustion Engine." This arrangement, includes two oxygen sensors (binary sensors), one situated on the upstream side of the catalytic converter and the other on the downstream side thereof, to measure the time lag between inversion of the output value of the upstream sensor and that of the downstream sensor. The condition of the catalyst is determined by the scale of the time difference thus measured. More specifically, the smaller the time difference, the greater the deterioration of the catalyst.

In such catalytic deterioration detection apparatus, however, the measured time difference fluctuates as the volume of exhaust gases fluctuates, without regard to deterioration of the catalytic converter itself, which reduces the accuracy of the deterioration assessment. As a result, a catalytic converter may be determined to be free from deterioration, even though it has in fact deteriorated.

SUMMARY OF THE INVENTION

An object of the present invention is to provide a catalytic diagnostic apparatus for an internal combustion engine that is capable of determining the condition of a catalytic converter accurately, without being affected by fluctuating elements such as variation in the output exhaust gas volume.

In order to accomplish this object, the catalytic diagnostic apparatus for an internal combustion engine according to the present invention has a first air-fuel ratio sensor disposed upstream of the catalyst, which is used to detect the air-fuel ratio of exhaust gases of the internal combustion engine, and a second air-fuel ratio sensor disposed on the downstream side of the catalyst, which is used to detect the air-fuel ratio of exhaust gases on the downstream side thereof. The quantity of fuel injected into the internal combustion engine is controlled in response to the output of the upstream $O_2$ sensor in a conventional closed loop, or feedback, control arrangement. For the purpose of diagnosing the condition of the catalytic converter according to the invention, a diagnostic area decision unit determines whether the engine is currently operating within a diagnostic decision area (that is, an area in which a valid diagnosis can be made) defined by predetermined engine operating parameters, and initiates diagnostic processing when the definitional criteria are satisfied. A downstream air-fuel ratio decision unit 20 then determines whether the output signal from the downstream sensor is on the rich side or the lean side of the air-fuel ratio relative to a stoichiometric mixture, and generates a signal which causes the feedback control apparatus to adjust the air-fuel mixture to make it leaner or richer accordingly. (When the air-fuel ratio is at the theoretical stoichiometric mixture, no such adjustment is necessary.) A deterioration decision unit decides whether the catalyst has deteriorated based on a deterioration index I calculated from the relationship between the respective output signals of the upstream and downstream air-fuel ratio sensors.

In another embodiment of the invention, the downstream air-fuel ratio control unit is omitted, and a correction factor calculating unit detects the intake air flow rate of the engine as well as the frequency of the cyclic variation of the output signal from the upstream $O_2$ sensor, and calculates a correction factor which is used to adjust the final deterioration index I. A third embodiment combines the features of the first and second.

The downstream air-fuel ratio control unit preferably includes a lean-rich decision unit for determining whether the air-fuel ratio drifts to the lean or rich side, and an air-fuel ratio shift coefficient calculating unit for calculating an air-fuel ratio shift coefficient according to a decision signal from the lean-rich decision unit, so as to supply the coefficient thus calculated to the fuel injection quantity control unit.

The deterioration decision unit preferably includes a correlation function calculating unit for calculating a cross correlation function between the output signal of the upstream air-fuel ratio sensor and that of the downstream air-fuel ratio sensor, and an autocorrelation function of the output signal of the upstream air-fuel ratio sensor. An instantaneous deterioration index calculating unit periodically calculates an instantaneous deterioration index as the ratio of the maximum value of the cross correlation function to that of the autocorrelation function, and a final deterioration index calculating unit calculates the mean value of a predetermined number of instantaneous deterioration indexes as the final deterioration index. A comparator then compares the final deterioration index with a predetermined reference deterioration index, and a decision unit determines catalytic deterioration according to an output signal from the comparator.

In another preferred embodiment, the catalytic diagnostic apparatus for an internal combustion engine according to the invention has a catalytic diagnostic area decision unit which establishes predetermined limiting parameters of a catalytic diagnostic area, and the downstream air-fuel ratio control unit and the deterioration decision unit are operated only when the conditions of the catalytic diagnostic area have been satisfied.

These conditions are determined to be satisfied when the engine speed (detected by an engine speed sensor) is greater than a predetermined speed level, and the catalytic temperature (estimated from the engine speed and the intake air quantity detected by an air flow rate detector), is also above a predetermined temperature level.

Preferably, the upstream and downstream air-fuel ratio sensors in the catalytic diagnostic apparatus according to the invention are oxygen sensors; however, other types of sensors, such as for example, linear sensors, may be used. Also, the correction factor output unit includes an engine intake air quantity calculating unit, an output signal frequency calculating unit in the upstream air-fuel ratio sensor, a correction factor storage unit containing a look up table of predetermined correction factor values, and a reader unit for reading a correction factor from the storage unit, based on the engine intake air quantity and the frequency of the output signal of the upstream air-fuel ratio sensor. The correction factor thus determined is supplied to the final deterioration index calculating unit.

When the output signal of the downstream air-fuel ratio sensor is outside the predetermined range due to fluctuations in exhaust gas volume, the fuel injection quantity control unit adjusts the fuel injection quantity. When the output signal of the downstream air-fuel ratio sensor is within the predetermined range, the diagnosis of the catalytic deterioration is carried out, based on the relationship between the respective output signals of the upstream and downstream air-fuel ratio sensors. Therefore, the catalytic deterioration diagnosis is carried out accurately without being affected by fluctuations in volume of exhaust gases.

The correlation function calculating unit calculates the cross correlation function of the output signals of the upstream and downstream air-fuel ratio sensors, as well as the autocorrelation function of the output signal of the upstream air-fuel ratio sensor. Then the instantaneous deterioration index calculating unit periodically calculates the instantaneous deterioration index as the ratio of the maximum value of the cross correlation function to the value of the autocorrelation function. In the second and third embodiments of the invention, the correction factor output unit calculates and outputs a correction factor according to the intake air quantity of the engine and the frequency of the output signal of the upstream air-fuel ratio sensor, as described above. The final deterioration index calculating unit calculates the mean value of a predetermined number of periodic instantaneous deterioration indexes, and corrects the mean value thus calculated using the correction factor. The deterioration of the catalyst is determined using the corrected mean value as the final deterioration index. Therefore, the deterioration of the catalyst can be decided accurately, without being affected by fluctuations in not only the output frequency of the upstream air-fuel ratio sensor but also intake air quantity.

Provided it is so arranged that the final deterioration index is corrected based the frequency of the output signal of the upstream air-fuel ratio sensor and the intake air quantity of the engine while the output signal of the downstream air-fuel ratio sensor falls within the predetermined diagnostic range at the time the catalyst is diagnosed, the deterioration of the catalyst can be decided accurately without being affected by fluctuations in volume of exhaust gases, the output frequency of the downstream air-fuel ratio sensor or the intake air quantity.

If intake air quantity, water temperature and fuel injection quantity are taken into account, diagnostic information may be made even more reliable.

Other objects, advantages and novel features of the present invention will become apparent from the following detailed description of the invention when considered in conjunction with the accompanying drawings.

BRIEF DESCRIPTION OF THE DRAWINGS

FIG. 2 is a partial schematic block diagram of the embodiment of FIG. 1;

FIG. 5 is a graph illustrating the deterioration diagnostic area of the catalytic converter;

FIG. 7 shows waveform charts illustrating the movement of the air-fuel ratio toward a stoichiometric mixture;

FIG. 10 is a graph showing the relationship between fluctuations in the frequency of the upstream $O_2$ sensor as well as the intake air quantity, and the deterioration index;

DETAILED DESCRIPTION OF THE DRAWINGS

Figure 1:
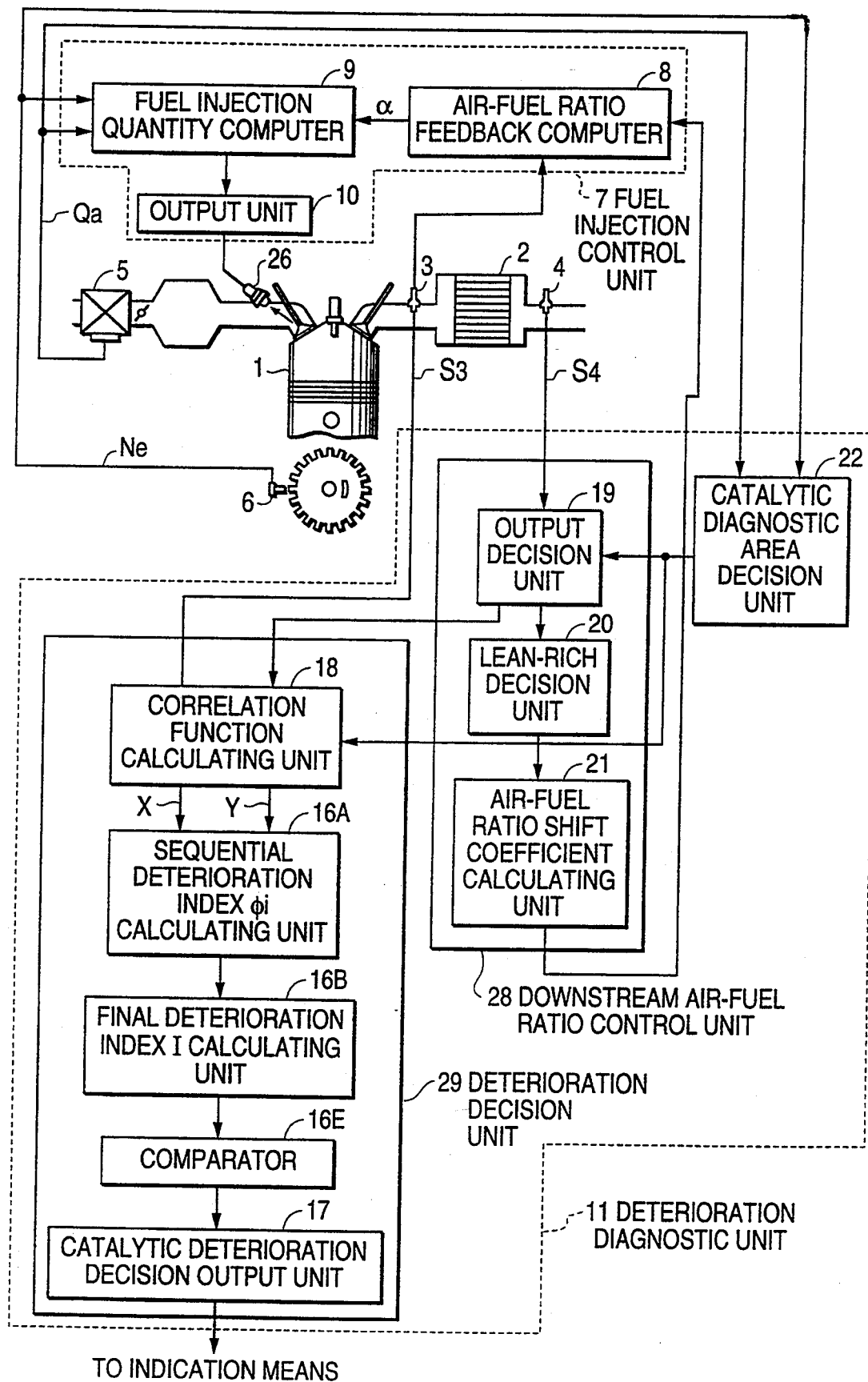
FIG. 1 is a schematic block diagram of a first embodiment of the present invention.

FIG. 1 is a schematic block diagram of a first embodiment of the present invention, in which a fuel injection control unit 7 having an air-fuel ratio feedback computer 8, a fuel injection quantity computer 9 and an output unit 10, controls the quantity of fuel supplied to an engine 1. An upstream $O_2$ sensor, (that is, an air-fuel ratio sensor) 3 is placed on the engine side of a catalytic converter 2. This sensor is a lambda ($\lambda$) sensor whose detection element is made of, for example, zirconia or titania.

The fuel injection quantity computer 9 calculates the fundamental injection quantity FO from the following equation (1) based on the intake air quantity Qa detected by an intake air quantity sensor 5 and the rotational speed Ne of the engine detected by a speed sensor 6:

$$FO = KO \cdot \frac{Q_a}{Ne} \quad (1)$$

where kO=a predetermined proportionality constant.

On the other hand, the air-fuel ratio feedback computer 8 samples output signals of the upstream $O_2$ sensor 3 at predetermined intervals, calculates a correction coefficient $\alpha$ so as to set the air-fuel ratio to a predetermined value according to what has been detected, end supplies the coefficient $\alpha$ to the fuel injection quantity computer 9.

The fuel injection quantity computer 9 then calculates an injection quantity F from the following equation (2) by adding the correction coefficient $\alpha$ to the fundamental injection quantity FO.

$$F = KO \cdot \frac{Q_a}{Ne(1 + \alpha)} \quad (2)$$

The fuel injection quantity computer 9 supplies a signal indicating the injection quantity F thus calculated to the output unit 10, which applies a voltage duty signal corresponding to the injection quantity F, to a fuel injection valve 26. With this manner of feedback air-fuel ratio control, the input air-fuel ratio varies cyclically about an approximately stoichiometric mixture on the upstream side of the catalytic converter 2.

According to the present invention, the fluctuation of the air-fuel ratio under the air-fuel ratio feedback control is utilized for a test signal to diagnose the deterioration of the catalytic converter. In other words, owing to oxidation-deoxidization of the catalyst, the air-fuel ratio changes less on the downstream side of the catalytic converter 2 unless the catalytic converter 2 is deteriorated. If, however, the catalytic converter 2 deteriorates, the cyclic variation of the air-fuel ratio on the downstream will approximate that on the upstream side. Such deterioration is thus diagnosed by giving special attention to the similarity of the cyclic variation of the air-fuel ratio on both sides of the catalytic converter.

For this purpose, a deterioration diagnostic unit 11 is provided with a catalytic diagnostic area decision unit 22, a downstream air-fuel ratio control unit 28 and a deterioration decision unit 29. The downstream air-fuel ratio control unit 28 includes an output decision unit 19, a lean-rich decision unit 20 and an air-fuel ratio shift coefficient calculating unit 21. Further, the deterioration decision unit 29 includes a correlation function calculating unit 18, an instantaneous deterioration index $\Phi i$ calculating unit 16A, a final deterioration index I calculating unit 16B, a comparator 16E and a catalytic deterioration decision output unit 17. The catalytic diagnostic area decision unit 22 is supplied with output signals respectively from the intake air quantity sensor 5 and the speed detection sensor 6.

A determination of whether or not the catalytic converter 2 has deteriorated is made only when the engine operating parameters fall within certain predetermined ranges, referred to as a diagnostic area Da. In particular, for example, the engine 1 must be driven at not less than a predetermined speed, and the temperature of the catalytic converter 2 must be at least 500° C. as shown in FIG. 5. The catalytic diagnostic area decision unit 22 determines whether or not these conditions have been met. When they are, a diagnostic execution signal is supplied from the catalytic diagnostic area decision unit 22 to the output decision unit 19 and the correlation function calculating unit 18, which initiate the diagnosis in response thereto.

FIG. 2 illustrates the operation of the calculating units 18, 16A, 16B, the comparator 16E and the catalytic deterioration decision output unit 17, which collectively make up the deterioration decision unit 29.

As shown in FIG. 2, the correlation function calculating unit 18 includes data sampling units 12A, 12B, memories 13A, 13B, an autocorrelation calculating unit 14A, a cross correlation function calculating unit 14B and a cross correlation function calculating unit 14D. The output signal S3 of the upstream $O_2$ sensor 3 is supplied to the sampling unit 12A, where it is sampled at fixed time intervals (or angles). The sampled values are temporarily stored in the memory 13A. The output signal S4 of a downstream $O_2$ sensor (air-fuel ratio sensor) is supplied via the output decision unit 19 (not shown in FIG. 2) to the sampling unit 12B and sampled at fixed time intervals (or angles) with the sampled values being temporarily stored in the memory 13B.

Output signals x, y are supplied respectively from the memories 13A, 13B to the cross correlation function calculating unit 14B, which carries out calculations according to the following equations (3-1)~(3-n):

$$\Sigma x_n y_0 = x_0 y_0 + \ldots x_{odn} y_0 \quad (3 - 1)$$

$$\Sigma x_n y_{01} = x_{01} y_{01} + \ldots x_{odn} y_{01} \quad (3 - 2)$$

$$\vdots$$

$$\Sigma x_{nn} y_{0n} = x_{0n} y_{0n} + \ldots x_{odnn} y_{0n} \quad (3 - n)$$

Figure 3A:
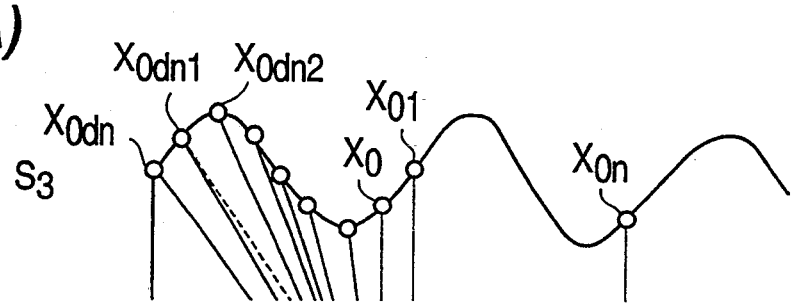
FIG. 3 is a diagram illustrating correlation calculations carried out by the correlation calculating unit.
Figure 3B:
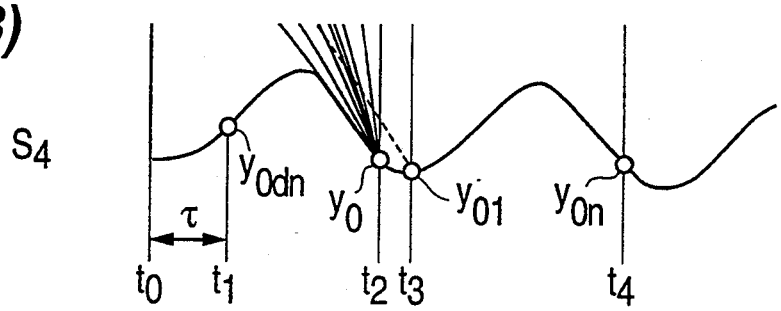

In other words, the products of the signal $y_0$ of the sensor 4 at time t2 in FIG. 3(B) and those of the sensor 3 in FIG. 3(A), ranging from $x_{odn}$ at a point in time t0 up to $x_0$ thereof, are calculated, respectively. Then the products of the signal $Y_{01}$ at time t3 and those values of x ranging from the signal $x_{odn1}$ up to the signal $x_{01}$ thereof are calculated, respectively. The products of the signal $Y_{On}$ and those ranging from $x_{odnn}$ up to $x_{On}$ are thus calculated until the desired result is obtained. In FIG. 3, time $\tau$ from t0 to t1 is equivalent to the delay time (phase difference) of the output signal S4 of the sensor 4 relative to the output signal S3 of the sensor 3. The product of the signals x, y is maximized when x is shifted by a delay of $\tau$.

The results obtained from Eqs. (3-1)~(3-n) are supplied to the cross correlation function calculating unit 14D which calculates a cross correlation function Y according to the following equation (4).

$$Y = \sum_{i}^{n} x_0 y_{0i} + \ldots + \sum_{i}^{n} x_{odni} y_{0i} \quad (4)$$

The output signal x from the memory 13A is also supplied to the autocorrelation calculating unit 14A, which carries out a calculation according to the following equation (5).

$$X = \sum_{i}^{n} x_i^2 \quad (5)$$

The autocorrelation function X and the cross correlation function Y that have thus been calculated are supplied to the calculating unit 16A, which periodically calculates the instantaneous deterioration index Φi from the following equation (6)

$$\Phi_i = Y_M/X \qquad (6)$$

where YM=maximum value in a term constituting the cross correlation function Y.

Figure 4:
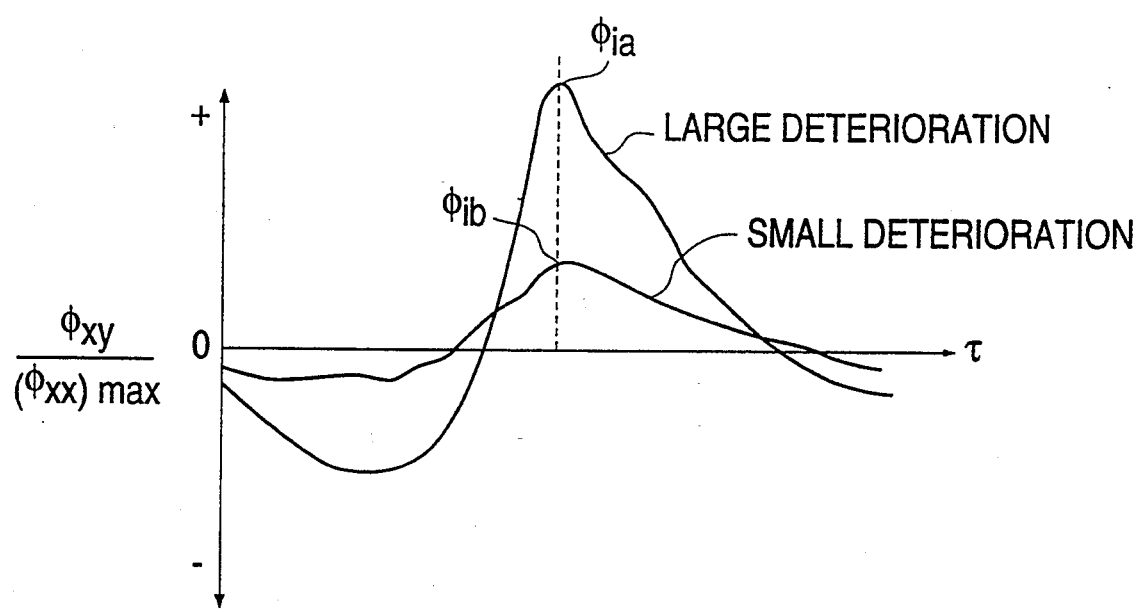
FIG. 4 is a graph showing the relationship between the deterioration of the catalytic converter and the deterioration index $\Phi i$.

Since the similarity of the variation of the air-fuel ratio on both sides of the catalytic converter 2 increases when the catalytic converter 2 deteriorates, the periodic instantaneous deterioration index Φi also becomes higher (close to 1) as shown in FIG. 4. In other words, a deterioration index Φia when the catalytic converter 2 is substantially deteriorated has a greater maximum value than a deterioration index Φib when the deterioration of the catalytic converter is slight.

The instantaneous deterioration indices Φi are thus calculated periodically and supplied to the final deterioration index I calculating unit 16B.

As shown by the following equation (7), the arithmetic mean value of n instantaneous deterioration indices Φi is calculated in the calculating unit 16B, and is set as the final deterioration index I for the catalytic converter 2.

$$I = \frac{1}{n} \Sigma \phi i$$

When the final deterioration index I is calculated, correction factors under various operating conditions may be added thereto; for example, a correction coefficient k1 deriving from the engine load and a correction coefficient k2 deriving from the catalyst temperature may be added so as to make I=(Σk1k2Φi)/n. In this case, the correction coefficients k1, k2 are stored in a look up table.

The final deterioration index I thus calculated is supplied to the comparator 16E, and compared with a predetermined deterioration reference level ID. When the final deterioration index I is equal to or greater than the deterioration reference level ID, a deteriorated condition of the catalytic converter is determined to exist, and a signal to that effect is supplied to the decision output unit 17. Then the decision output unit 17 drives a display (not shown), indicating that the catalytic converter 2 has been deteriorated.

The reason for use of the mean value as the final deterioration index I instead of using the periodically calculated instantaneous deterioration index Φi directly is that if either the engine speed or load fluctuates during traveling, the instantaneous deterioration index Φi may also fluctuate in response. Therefore, the instantaneous deterioration indexes Φi obtained during a fixed period of time, at a fixed speed or at a fixed load zone are accumulated and by making their mean value the final deterioration index I, erroneous readings due to transient conditions (such as rapid vehicle acceleration) are suppressed, and it is possible to evaluate deterioration of the catalyst over the whole driving range. However, the instantaneous deterioration index Φi may be employed directly for making such a decision as long as the driving condition is properly controlled.

Figure 6A:
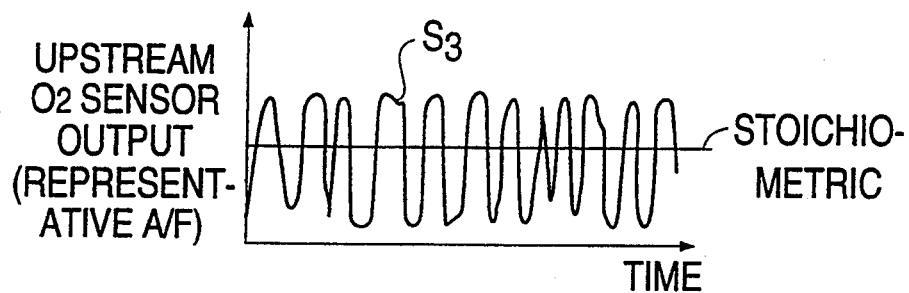
FIG. 6 shows waveform charts illustrating the movement of the air-fuel ratio toward a stoichiometric mixture.
Figure 6B:
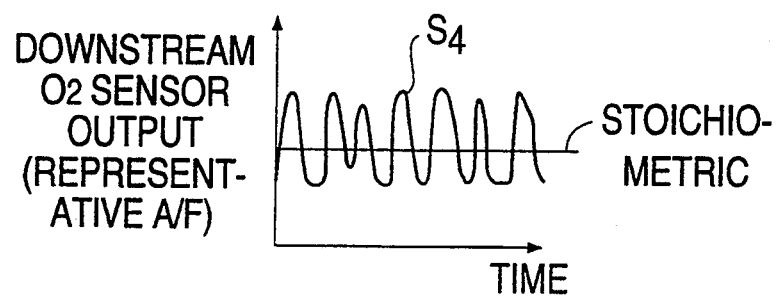
Figure 6C:
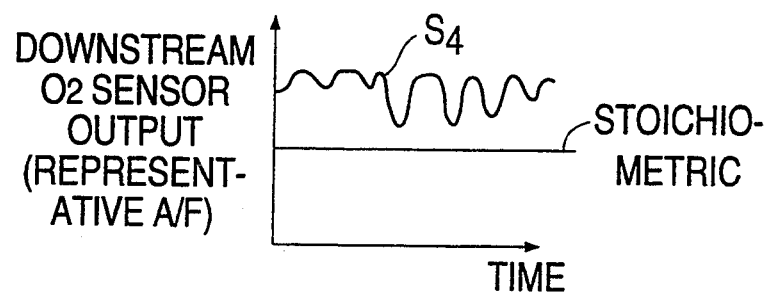

When the correlation function is used to determine catalytic deterioration, the correlation function can be calculated accurately only if the air-fuel ratio at the downstream O2 sensor 4 (FIG. 6(B)) fluctuates at (on both sides of) the stoichiometric line ST. The output S3 of the upstream sensor 3 is maintained close to the stoichiometric point (FIG. 6(A)) by virtue of the feedback control described previously. However, the output signal S4 of the downstream O2 sensor 4 tends to drift to the rich or lean side as shown in FIG. 6(C) because of variation in exhaust quantity, and consequently the correlation function may not be calculated accurately. Thus, the output decision unit 19 compares the output time of the rich side of the signal S4 with that of the lean side, and from this comparison determines whether S4 is proximate to the stoichiometric line. (Approximately equal output times would indicate that it is.) If S4 is not near the stoichiometric line the signal S4 is supplied to decision unit 20, which determines whether it is on the lean side or rich side, and supplies the result to the air-fuel ratio shift coefficient calculating unit 21. The air-fuel ration shift coefficient calculator generates a fuel ratio adjustment signal which is supplied to the air-fuel ratio feedback computer 8 to modify the air-fuel mixture to make it leaner or richer.

As shown in FIG. 7(A), the air-fuel ratio shift coefficient calculator unit 21 supplies a signal to the air-fuel ratio feedback computer 8 which causes the output signal S4 of the downstream O2 sensor 4 to move into proximity with the stoichiometric line by shifting it to the lean side when the air-fuel ratio is on the rich side, and shifting it to the rich side when it is on the lean side in the diagnostic area Da (from t1 up to t2). The correlation function of the output signal S3 of the upstream O2 sensor 3 shown in FIG. 7(B) with the downstream O2 sensor 4 shown in FIG. 7(C) can then be calculated accurately.

Therefore, in a preferred embodiment of the invention, instead of simply taking the mean value of N instantaneous degradation indices as described above, the final deterioration index calculation is performed by the final deterioration index calculator 16B by taking the mean of the m largest values of Φi, according to the following formula:

$$I = \frac{1}{M} \Sigma \ \text{max}_M(\phi_i)$$

where max$_M$(Φi) represents the M largest values of Φi within the designated time interval. For example, if M=3, then $$I = \frac{1}{3} \Sigma \ \text{max}_3 (\phi_i)$$

This calculation achieves greater diagnostic accuracy than a straight mean value calculation because the maximum deterioration index occurs at a time when the air-fuel ratio, as detected and indicated by the output signal S4 of the downstream O2 sensor 4, varies about the stoichiometric point, as shown in FIG. 7(D).

Figure 8:
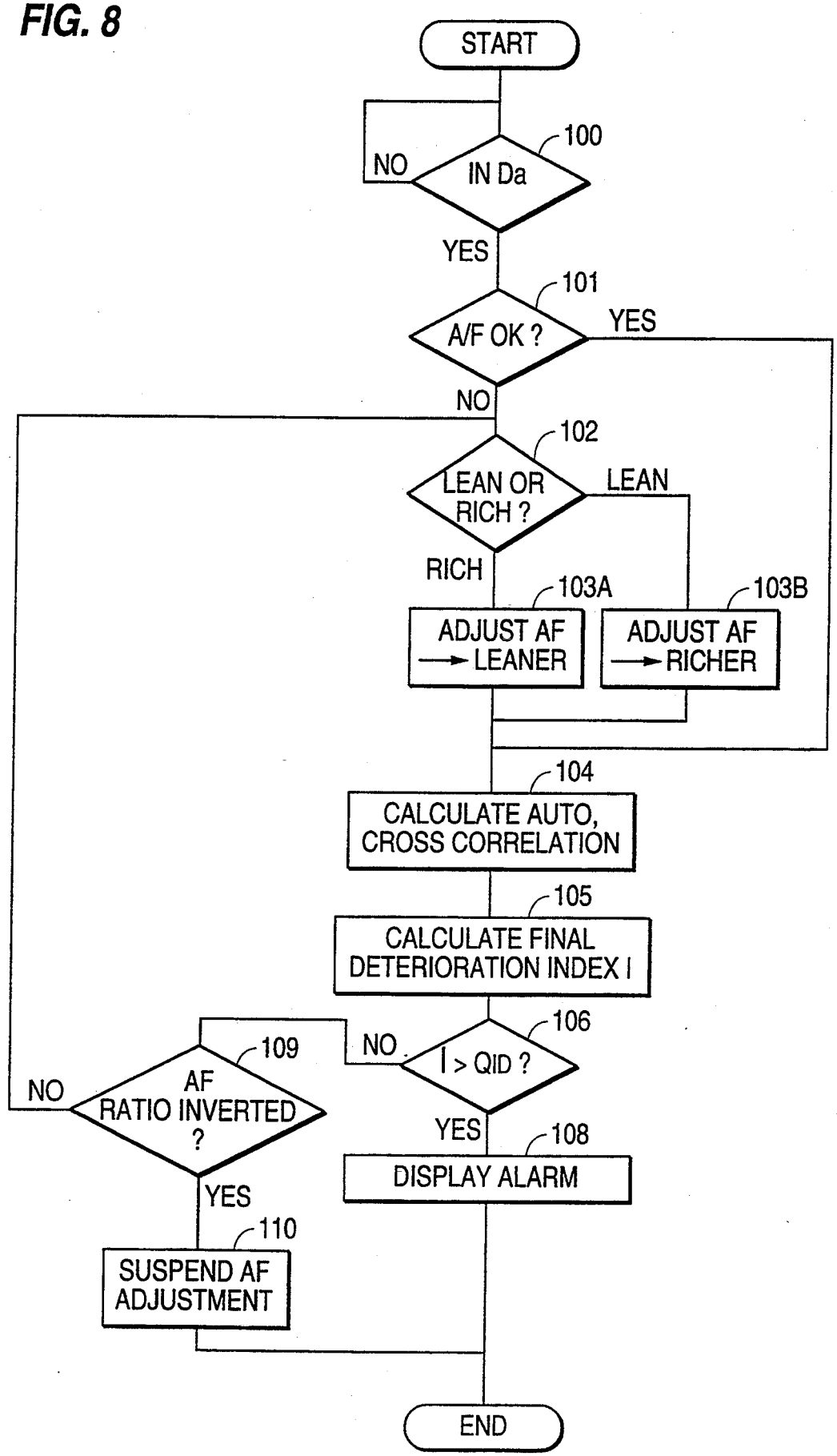
FIG. 8 is an operational flowchart of the example of FIG. 1.

FIG. 8 is a flowchart which shows the operation of the deterioration diagnostic unit 11 as described above. At Step 100 of FIG. 8, a decision is made on whether the catalytic diagnostic area decision unit 22 is in the diagnostic area Da and if so, at step 102 a determination is made by the lean-rich decision unit 20 whether S4 is on the lean side or on the rich side. If it is rich, at Step 103 the air-fuel ratio shift coefficient calculating unit 21 calculates a coefficient for shifting the air-fuel ratio AF from the rich to lean side, and supplies the calculated result to the air-fuel ratio feedback computer 8. IF $S_4$ is on the lean side, an opposite adjustment is made at step 103 B. (The air-fuel ratio feedback computer 8 corrects the correction coefficient $\alpha$ according to the coefficient supplied from the air-fuel ratio shift coefficient calculating unit 21 and supplies the corrected value to the fuel injection quantity computer 9, so that the air-fuel ratio is controlled as stated above.) Next, at Step 104 the autocorrelation function X and the cross correlation function Y are calculated by the correlation function calculating unit 18, so that the periodic instantaneous deterioration index $\Phi i$ can be calculated.

At Step 105 the calculating unit 16B calculates the final deterioration index I and the comparator 16E compares it with a reference value QID (step 106) to determine whether or not the catalytic converter 2 has deteriorated. If the catalytic converter 2 is judged deteriorated an alarm is activated (step 108). On the other hand, if it is found not to be deteriorated, a determination is made in step 109 whether the air-fuel ratio has been inverted (changed sign). If it has, air-fuel adjustment is suspended at step 210; and if not, steps 102–106 are repeated.

According to the above first embodiment of the present invention, the output signal S4 of the downstream $O_2$ sensor 4 is examined when the deterioration of the catalytic converter 2 is to be diagnosed, and if it is not in the neighborhood of the stoichiometric line, the air-fuel ratio is adjusted so that it is set close thereto. Whether or not the catalytic converter 2 has deteriorated is decided based on a correlation function of the signals S3, S4. It is therefore possible to provide a catalytic diagnostic apparatus capable of detecting a deteriorated condition of the catalytic converter 2 accurately for an internal combustion engine, without being affected by fluctuating elements such as variations in volume of the output exhaust gases.

Figure 9A:
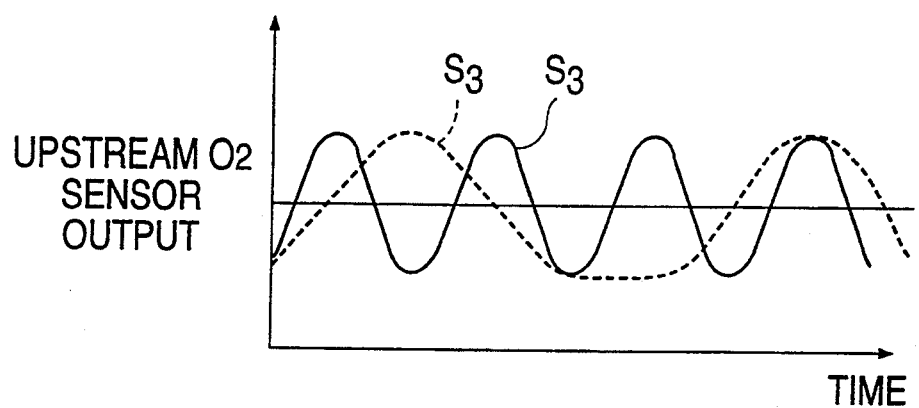
FIG. 9 contains waveform charts showing the relationship between the frequency of the output signal of the upstream $O_2$ sensor and the air-fuel ratio.
Figure 9B:
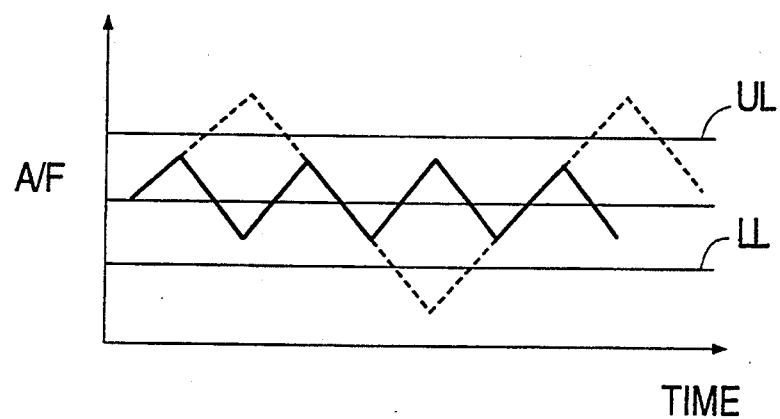

The cycling frequency of the output signal S3 of the upstream $O_2$ sensor 3 decreases as it deteriorates. (That is, the waveform shown by a solid line in FIG. 9(A) changes to that shown by a broken line.) When the frequency of the output signal S3 of the upstream $O_2$ sensor 3 is high, the air-fuel ratio AF fluctuates within a predetermined range (between the upper limit UL and the lower limit LL) as shown by the solid line of FIG. 9(B). When the frequency of the output signal S3 decreases, however, the fluctuation of the air-fuel ratio AF exceeds the above range, as shown by a broken line of FIG. 9(B), and an error tends to occur in the deterioration index I.

More specifically, as shown in FIG. 10, the detected deterioration index Ib tends to increase as the air-fuel ratio control frequency becomes lower, and decreases as it rises, relative to a true deterioration index IO (approximately 0.3). Further, the deterioration index varies with the quantity of exhaust gas G passing through the catalyst. That is, the deterioration index becomes relatively higher than the deterioration index Ib when the quantity of exhaust gas G is large (curve Ia), and the deterioration index becomes lower than the deterioration index Ib when the quantity of exhaust gas G is small (curve Ic).

Figure 11:
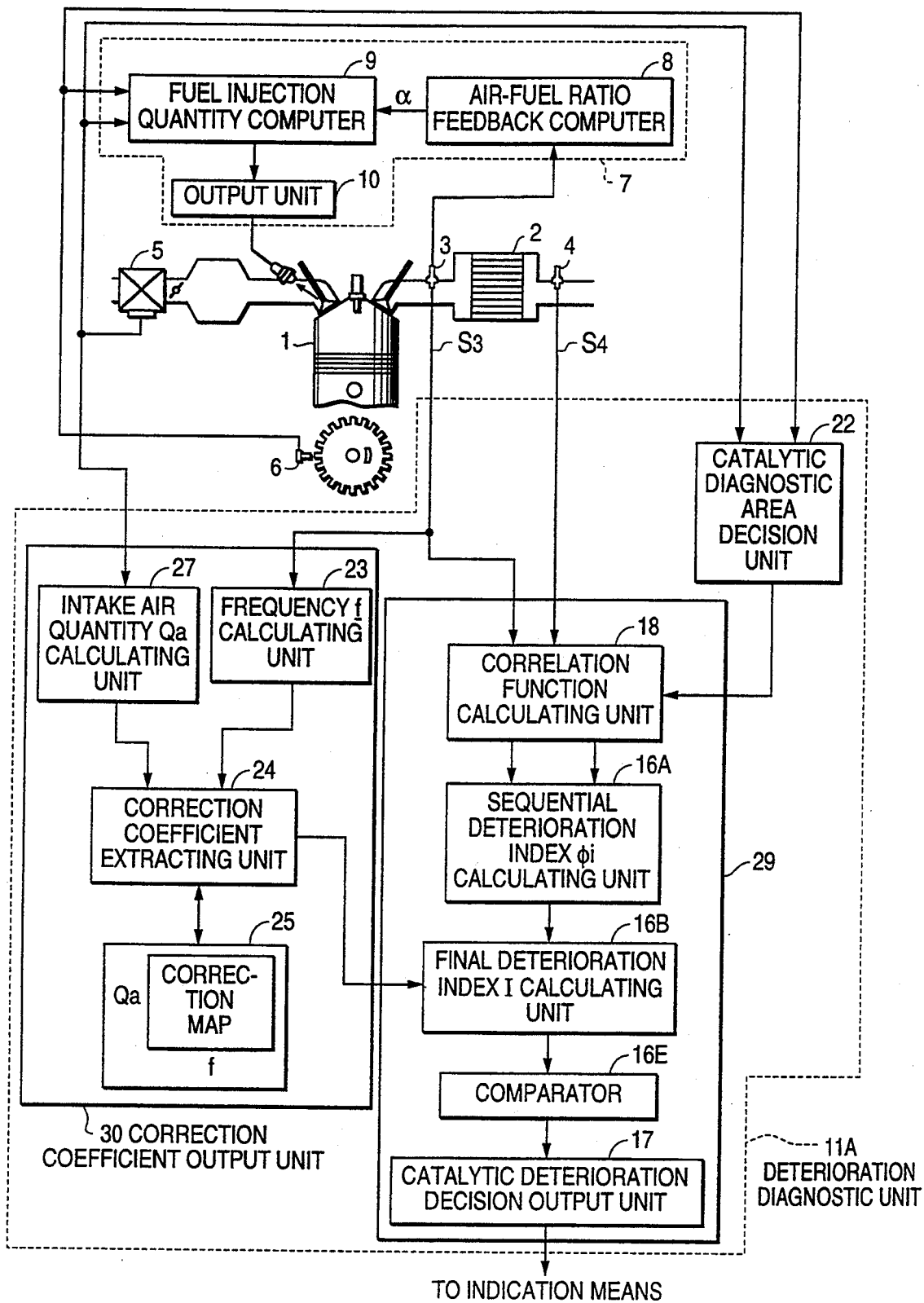
FIG. 11 is a schematic block diagram of a second embodiment of the present invention.

FIG. 11 is a schematic block diagram of a second embodiment of the invention which compensates for fluctuations of the frequency and the intake air quantity by adding a correction factor derived from a look up table based on detected values of these parameters. (Like reference characters designate like or corresponding component parts of the first embodiment.) In FIG. 11, a deterioration diagnostic unit t1A is provided with a catalytic diagnostic area decision unit 22, a deterioration decision unit 29 and a correction factor output unit 30. The correction factor output unit 30 includes an intake air quantity Qa calculating unit 27, a frequency f calculating unit 23, a correction factor reader unit 24 and a look up table 25.

The intake air quantity Qa calculating unit 27 calculates the intake air quantity Qa based on to the output signal from the intake air quantity sensor 5. (Qa in this case represents intake air quantity per unit time or per unit rotation of engine.) Further, the frequency f calculating unit 23 calculates the frequency f of the output signal S3 of the upstream $O_2$ sensor 3. The reader unit 24 reads a correction factor from the look up table 25 based on the an intake air quantity signal and the frequency signal from the calculating units 27, 23 respectively, which compensates for the deviation of the calculated deterioration index from the true value, as shown in FIG. 10. The correction factor is input to the final deterioration index I calculating unit 16B where it is added to the deterioration index I to compensate for fluctuations of the cycling frequency of the upstream $O_2$ sensor 3 and of the intake air quantity as noted.

Figure 12:
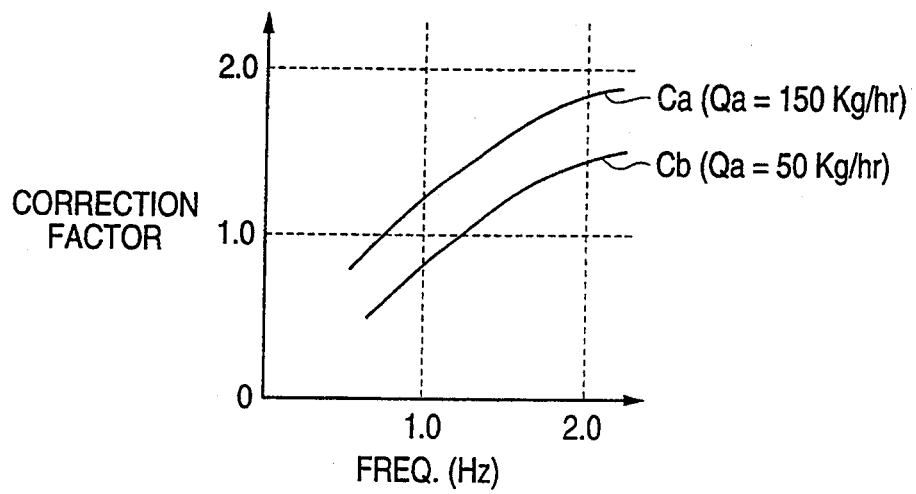
FIG. 12 is a graph illustrating the correction factors stored in the look up table.

The correction factors stored in the look up table 25 are determined experimentally beforehand. As shown in FIG. 12, the correction factors take the form of a family of characteristic curves for differing values of air flow $Q_a$. The representative values shown in FIG. 12 indicate, for example, that at a frequency of 1.0 Hz, the value of the correction factor for an air flow of 150 Kg/hr is 1.2, and for an air flow of 50 Kg/hr is 0.7.

Figure 13:
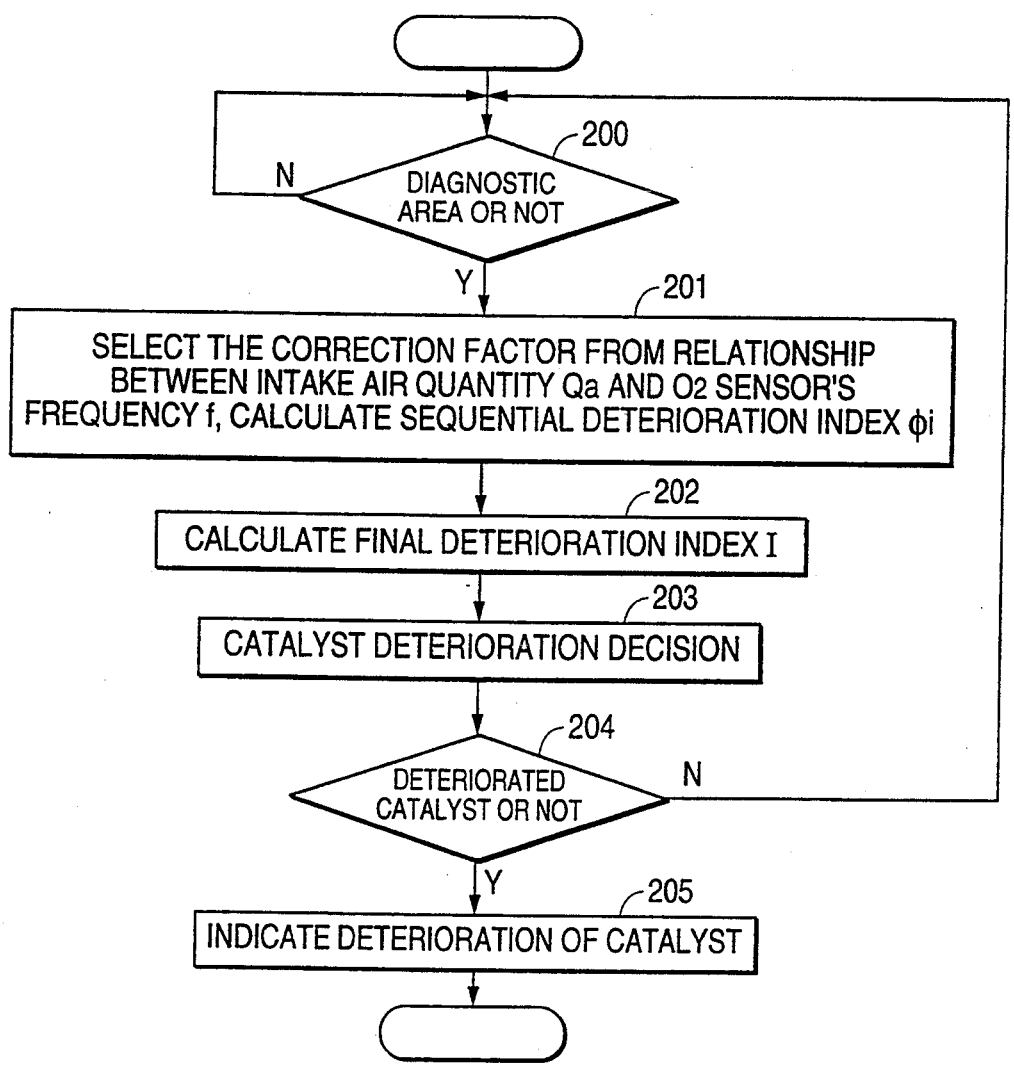
FIG. 13 is an exemplary operational flowchart of FIG. 10.

FIG. 13 is a flowchart which shows the operation of the deterioration diagnostic means 11A. At Step 200, a decision is made on whether the catalytic diagnostic area decision unit 22 is in the diagnostic area Da. If so, the reader unit 24 reads a correction factor from the look up table 25 (Step 201) according to the output signals from the calculating units 27 and 23 respectively, and supplies the correction factor to the calculating unit 16B. In Step 202 the calculating unit 16B calculates the final deterioration index I by adding the correction factor to the instantaneous deterioration index $\Phi i$, calculated by calculating units 18, 16A. Next, in step 203, the comparator 16E compares the final deterioration index I with the decision value QID and the reference output unit 17 determines whether the catalytic converter 2 has deteriorated. If the catalytic converter 2 is found not to be deteriorated (step 204), Step 200 is repeated. If however, it is found deteriorated, a display is activated in step 205 indicating the deteriorated condition.

In the above second embodiment of the present invention, the deterioration index I is compensated using a correction factor determined by the frequency f of the output signal S3 of the upstream $O_2$ sensor 3 and the intake air quantity Qa at the time the deterioration of the catalytic converter 2 is diagnosed. The compensated deterioration index I is then used to decide whether or not the catalytic converter 2 has deteriorated. It is therefore possible to provide a catalytic diagnostic apparatus capable of detecting deterioration of the catalytic converter 2 accurately for an internal combustion engine, without distortion by the fluctuations of the frequency of output signal S3 of the upstream $O_2$ sensor 3 and the intake air quantity Qa.

Figure 14:
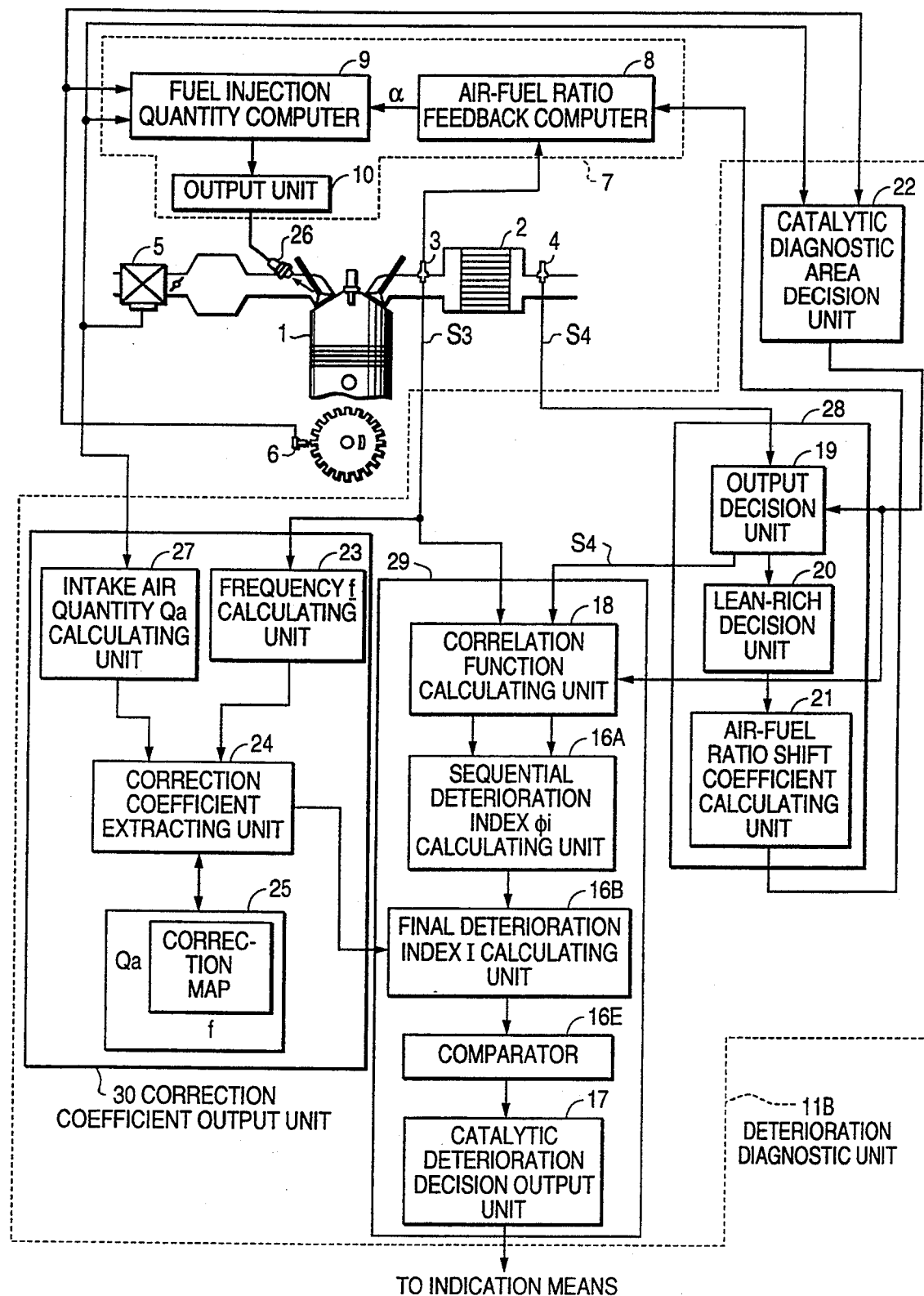
FIG. 14 is a schematic block diagram of a third embodiment of the present invention.

FIG. 14 is a schematic block diagram of a third embodiment of the present invention, which combines the features of the first and second embodiments. In this embodiment, the deterioration diagnostic unit 11B has a catalytic diagnostic area decision unit 22, a correction factor output unit 30, a downstream air-fuel ratio control unit 28 and the deterioration decision unit 29.

Figure 15:
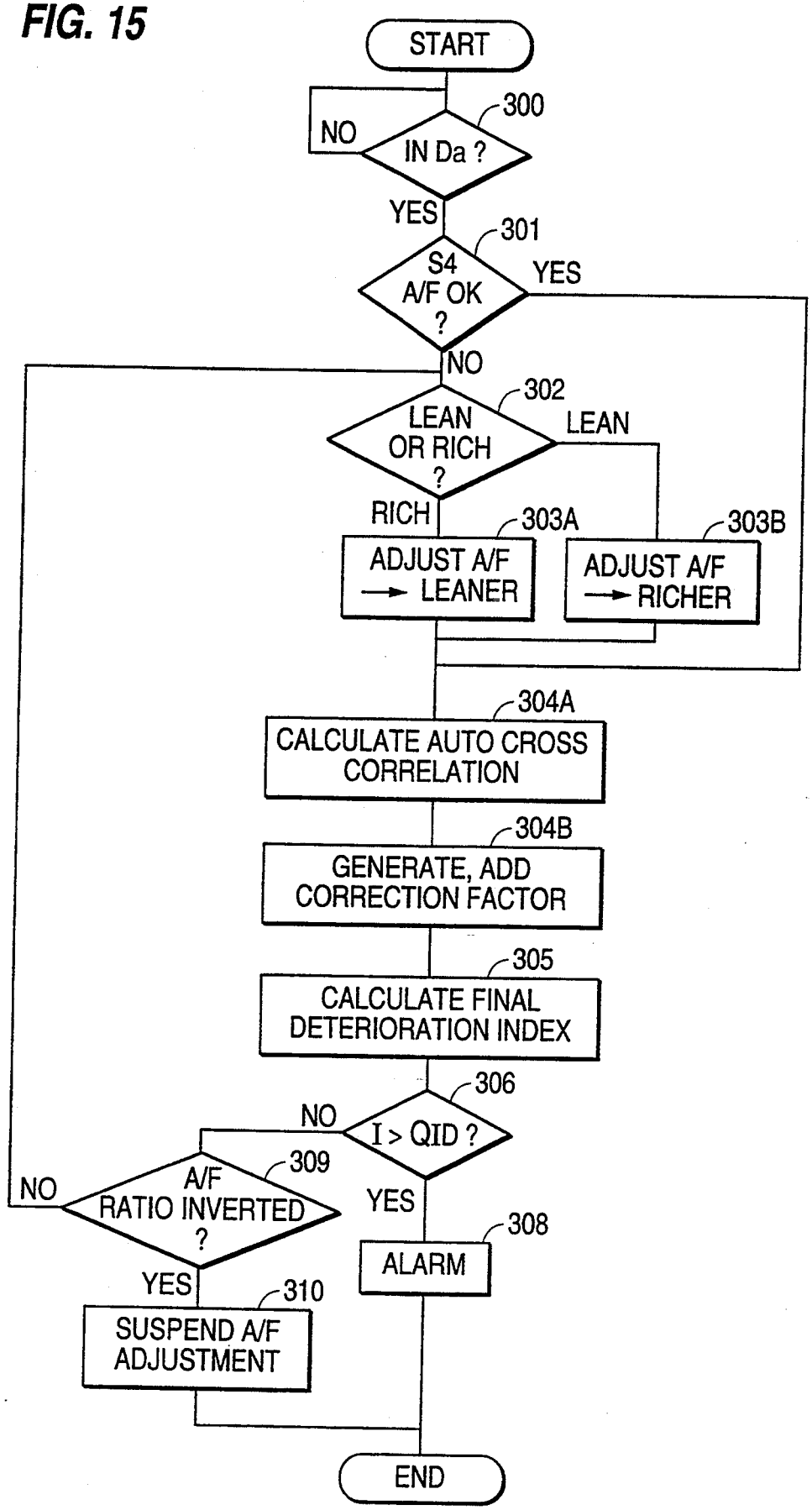
FIG. 15 is an exemplary operational flowchart of FIG. 13.

FIG. 15 is an operational flowchart for the deterioration diagnostic unit 11B. At Step 300 of FIG. 15, a decision is made by the catalytic diagnostic area decision unit 22 whether the vehicle is operating in the diagnostic area Da; and if it is, a decision is made by the output decision unit 19 on whether the output signal S4 of the downstream $O_2$ sensor 4 is proximate to the stoichiometric line. (This decision is made by comparing the output time of the rich signal of the signal S4 with that of the lean signal thereof.) If the signal S4 is not near the stoichiometric line, the signal S4 is supplied to the lean-rich decision unit 20 which decides whether the signal S4 is on the lean side or rich side (step 302). If it is on the lean side, an adjustment is made toward the rich side in step 303B, and if it is rich an adjustment is made to the lean side in step 303A, as described previously.

If it is on the rich side, in Step 303A the air-fuel ratio shift coefficient calculating unit 21 calculates a coefficient to shift the air-fuel ratio AF to lean side (or vice versa in step 303B), and the calculated result is supplied to the air-fuel ratio feedback computer 8, which corrects the correction coefficient $\alpha$ according to the coefficient supplied from the air-fuel ratio shift coefficient calculating unit 21 and supplies the correction signal $\alpha$ thus corrected to the fuel injection quantity computer 9. The air-fuel ratio is thus controlled as described above.

At Step 304A, the correlation function calculating unit 18 calculates the autocorrelation function X and the cross correlation function Y, to determine the periodic instantaneous deterioration index $\Phi i$, and at step 304B, the reader unit 24 reads a correction factor from the look up table 25 according to the output signals from the calculating units 27 and 23 respectively, and supplies the correction factor to the calculating unit 16B. The calculating unit 16B calculates the final deterioration index I as described previously (step 305) and adds the correction factor from the correction factor reader unit 24. The comparator 16E compares the resulting deterioration index I with the reference value QID (step 306) to determine whether or not the catalytic converter 2 has deteriorated. If the catalytic converter 2 is found not to be deteriorated, a determination is made in step 309 whether the air-fuel ratio has been inverted. If it has, air-fuel adjustment is suspended at step 310; and if it has not, steps 302–306 are repeated. If on the other hand, the catalytic converter 2 is determined to be deteriorated in step 306, the deteriorated condition is displayed by a display unit (not shown).

According to the third embodiment of the present invention, a decision is made on whether the output signal S4 of the downstream $O_2$ sensor 4 is in proximity to the stoichiometric line at the time the deterioration of the catalytic converter 2 is diagnosed; if it is not, the air-fuel ratio is adjusted to shift it close thereto. Then a correlation function of the signal S4 close to the stoichiometric line and the signal S3 is calculated. The deterioration index I is compensated by a correction factor determined by the frequency f of the output signal S3 of the upstream $O_2$ sensor 3 and the intake air quantity Qa; the compensated value is then used to determine whether the catalytic converter 2 has deteriorated. It is therefore possible to provide a catalytic diagnostic apparatus capable of detecting deterioration of the catalytic converter 2 accurately for an internal combustion engine, without distortion due to fluctuations in volume of exhaust gases, in the output signal S3 of the upstream $O_2$ sensor 3, in the intake air quantity Qa and the like.

Although the method and apparatus according to the invention are intended primarily to determine only whether the catalytic converter 2 has deteriorated, in the embodiments shown the upstream $O_2$ sensor 3 may be arranged so that it is also possible to determine when it is deteriorated. That is, the response speed of the upstream $O_2$ sensor 3 declines as its deteriorates and the autocorrelation function X decreases. The value of X in a case where the upstream $O_2$ sensor 3 is deteriorated is therefore determined and stored as a deterioration reference value XO. It is thus possible to detect deterioration of the upstream $O_2$ sensor 3 by comparing the value of X calculated by an autocorrelation function calculating unit 13 with the reference value XO.

Figure 16:
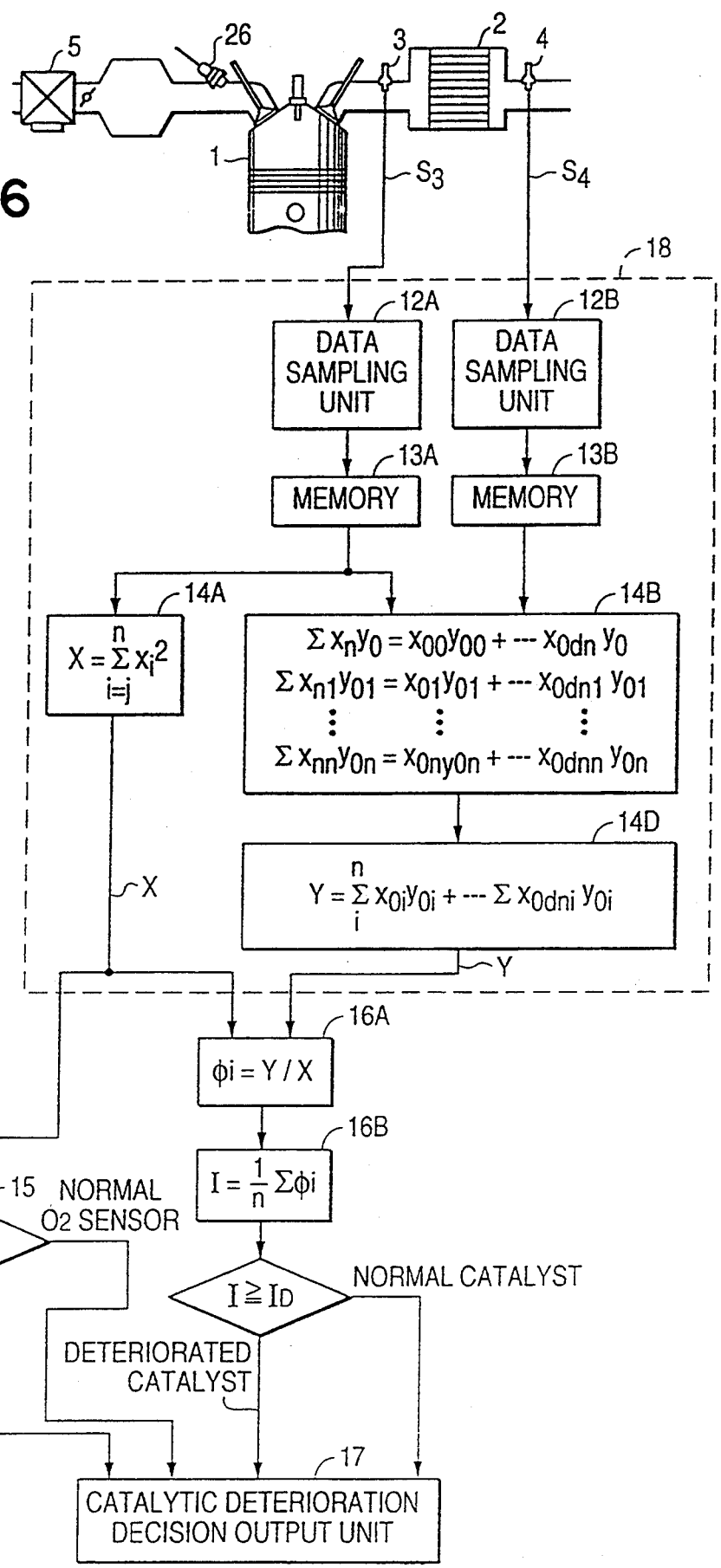
FIG. 16 is a partial block diagram in a case where the deterioration of the upstream $O_2$ sensor is also decided.

FIG. 16 is a block diagram of an embodiment of the invention in which an upstream $O_2$ sensor deterioration decision unit 15 has been added to determine whether the upstream $O_2$ sensor 3 has deteriorated. In this embodiment, the value of X calculated by the autocorrelation function calculating unit 13 is supplied to the upstream $O_2$ sensor deterioration decision unit 15 as well as to the periodic instantaneous deterioration index $\Phi i$ calculating unit 16A. The decision unit 15 decides whether the calculated value of X is greater than or equal to reference value XO. If it is less than the reference value XO, the upstream $O_2$ sensor is determined to be deteriorated and a signal to that effect is supplied to the decision output unit 17 and displayed by a display means (not shown). The decision output unit 17 then outputs a signal indicating whether the catalytic converter 2 or the upstream $O_2$ sensor 3 has deteriorated.

The example shown in FIG. 16 is applicable to any one of the first, second and third embodiments, and is capable of determining the deterioration of not only the catalytic converter 2 accurately, but also the upstream $O_2$ sensor 3, without the addition of further apparatus.

Although a description has been given of detecting deterioration of the upstream $O_2$ sensor 3 (which is prone to deterioration), a decision may also be made on deterioration of the downstream $O_2$ sensor 4 as well. Although the catalytic diagnostic area decision unit 22 has been configured to estimate the catalytic temperature from the engine speed Ne and the intake air quantity Qa in the embodiments above, it may also be acceptable to detect the temperature of the catalytic converter 2 by fitting a temperature sensor to it. Moreover, the temperature of the catalytic converter 2 may also be estimated from the integrated value of fuel injection quantity and engine starting time.

Although the catalytic temperature and engine speed are used to judge whether the vehicle is operating in the catalytic diagnostic area in the embodiments above, vehicle speed, engine speed, cooling water temperatures, engine loads and the like may also be used to for this purpose.

In the first, second and third embodiments, deterioration of catalyst is determined according to the correlation function of the respective output signals S3, S4 of the upstream and downstream $O_2$ sensors by controlling the output signal S4 of the downstream $O_2$ sensor 4 to move it into proximity with the stoichiometric line. Deterioration of the catalytic converter 2 may also be decided according to the inversion time difference between the output signal of the upstream and downstream sensors or the difference between the output signal frequency of the upstream $O_2$ sensor and that of downstream $O_2$ sensor, by controlling the output signal of the downstream $O_2$ sensor to move it into proximity with the stoichiometric line. Furthermore, deterioration of the catalytic converter 2 may also be determined based on the difference between the output signal amplitude of the upstream and downstream $O_2$ sensors or by the ratio of the former to the latter.

Although the output signal S4 of the downstream $O_2$ sensor 4 is supplied via the output decision unit 19 to the correlation function calculating unit 18 in the first and third embodiments above, the output signal S4 of the downstream $O_2$ sensor may be supplied directly to the correlation function calculating unit 18. In this case, a signal permitting the correlation function calculating unit 18 to start calculation may be supplied from the output decision unit 19 to the correlation function calculating unit 18.

In the second and third embodiments above, the correction factor has been determined by the frequency f of the output signal S3 of the upstream $O_2$ sensor 3 and the intake air quantity Qa. Such a correction factor may also be determined, however, based on the calculated inclination of the waveform of the output signal S3 instead of the frequency f and the intake air quantity Qa, as shown in FIG. 17. In that embodiment, signal S3 is passed through a differential filter 23A and its slope is calculated, in slope calculator 23B. The detected slope value is then used with the intake air quantity signal $Q_a$ from detector 27, to read a correction factor from the look up table 25.

Finally, while oxygen sensors have been used as air-fuel ratio sensors in the embodiments above, any other kinds of sensors may be employed as long as they are used for detecting air-fuel ratios.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed

1. Diagnostic apparatus for catalytic converter of an internal combustion engine having a fuel input control system, said apparatus comprising:
   a first air-fuel ratio sensor situated upstream of said catalytic converter relative to a direction of gas flow therein;
   a second air-fuel ratio sensor situated downstream of said catalytic converter relative to said direction of gas flow;
   a downstream air-fuel ratio control unit for detecting when an output signal from said second air-fuel ratio sensor falls outside a predetermined range, and generating a signal to cause said fuel input control system to adjust an amount of fuel input to said engine to shift said output signal of said second air-fuel ratio sensor to said predetermined range; and
   a deterioration index calculating unit for determining a deterioration index indicative of an extent of deterioration of said catalytic converter in response to output signals from said first and second air-fuel ratio sensors, when said output of said second air-fuel ratio sensor is within said predetermined range.

2. Apparatus according to claim 1 further comprising:
   at least one engine operating sensor for generating an output signal indicative of at least one operating parameter of said engine;
   a diagnostic area decision unit for detecting when said output signal from said at least one engine operating sensor falls within a predetermined diagnostic area, and enabling calculation of said deterioration index by said deterioration index calculating unit in response thereto.

3. Apparatus according to claim 2 wherein said at least one operating sensor comprises a plurality of operating sensors, and said diagnostic area decision unit enables calculation of said deterioration index when an output of all of said plurality of operating sensors falls within said diagnostic area.

4. Apparatus according to claim 3 wherein said plurality of operating sensors includes at least a sensor for engine rotational speed and a sensor for intake air flow of said engine.

5. Apparatus according to claim 1 wherein said first and second sensors are $O_2$ sensors.

6. Apparatus according to claim 1 wherein said downstream air-fuel ratio control unit comprises:
   an output decision unit for determining when the output signal from the second air-fuel ratio sensor varies within predetermined limits proximate to a stoichiometric mixture;
   a lean-rich decision unit for determining whether said output signal from the second air-fuel ratio sensor varies on a rich side or a lean side of said predetermined limits; and
   an air fuel ratio shift coefficient calculator coupled to receive an output from said lean-rich decision unit and generate a fuel ratio adjustment signal in response thereto, which signal is input to said fuel input control system.

7. Apparatus according to claim 6 wherein said output decision unit compares output time of a rich side of the output signal of the second air-fuel ratio sensor with output time of a lean side thereof.

8. Apparatus according to claim 1 wherein said deterioration index calculating unit comprises:
   a correlation function calculator coupled to receive first and second output signals from said first and second air-fuel ratio sensors, respectively, and calculate a cross correlation function of said first and second output signals and an autocorrelation function of said first output signal;
   an instantaneous deterioration index calculator for periodically calculating an instantaneous deterioration index based on results of said cross correlation function and said autocorrelation function calculations, which are input to said instantaneous deterioration index calculator from said correlation function calculator; and
   a final deterioration index calculator for periodically determining a final deterioration index equal to a mean value of instantaneous deterioration index values calculated by said instantaneous deterioration index calculator.

9. Apparatus according to claim 8 wherein said deterioration index calculating unit further comprises:
   a comparator coupled to receive said final deterioration index calculated by said final deterioration index calculator, and compare it with a predetermined deterioration reference level; and a deterioration decision unit for activating an alarm when said final deterioration index is greater than said deterioration reference level.

10. Apparatus according to claim 9 wherein said instantaneous deterioration index calculator calculates said instantaneous deterioration index according to the following formula:

$$\phi_i = \frac{Y_M}{X}$$

where $\Phi_i$ is the instantaneous deterioration index, $Y_M$ is a maximum value of the cross correlation function and X is the calculated autocorrelation function value.

11. Apparatus according to claim 8 wherein said final deterioration index calculator determines said final deterioration index based on a predetermined number of instantaneous deterioration index values having greatest magnitude.

12. Diagnostic apparatus for catalytic converter of an internal combustion engine, comprising:
- a first air-fuel ratio sensor situated upstream of said catalytic converter relative to a direction of gas flow therein;
- a second air-fuel ratio sensor situated downstream of said catalytic converter relative to said direction of gas flow;
- a deterioration index calculating unit for determining a deterioration index indicative of an extent of deterioration of said catalytic converter in response to output signals from said first and second air-fuel ratio sensors;
- a correction factor calculator for determining a correction factor to adjust said deterioration index to compensate for deviations due to variation of intake air quantity of said engine and a cycling frequency of an output of said downstream air-fuel ratio sensor.

13. Apparatus according to claim 12 further comprising:
- at least one engine operating sensor for generating an output signal indicative of at least one operating parameter of said engine;
- a diagnostic area decision unit for detecting when said output signal from said at least one engine operating sensor falls within a predetermined diagnostic area, and enabling calculation of said deterioration index by said deterioration index calculating unit in response thereto.

14. Apparatus according to claim 13 wherein said correction factor calculator comprises:
- means for periodically sensing and sampling a volume of intake air which flows into said engine;
- means for periodically sensing and sampling a cycling frequency of the output signal from said first air-fuel ratio detector;
- a look up table having stored therein predetermined correction factors to compensate said deterioration index in response to variations of intake air quantity and cycling frequency of said first air-fuel ratio sensor; and
- a reader for periodically reading a correction factor from said look up table based on said sampled intake air volume and cycling frequency, and providing said correction factor to said deterioration index calculating unit.

15. Apparatus according to claim 14 wherein said deterioration index calculating unit comprises:
- a correlation function calculator coupled to receive first and second output signals from said first and second air-fuel ratio sensors, respectively and calculate a cross correlation function of said first and second output signals and an autocorrelation function of said first output signal;
- an instantaneous deterioration index calculator for periodically calculating an instantaneous deterioration index based on results of said cross correlation function and said autocorrelation function calculations, input to said instantaneous deterioration index calculator from said correlation function calculator; and
- a final deterioration index calculator for periodically determining a final deterioration index equal to a mean value of instantaneous deterioration index values calculated by said instantaneous deterioration index calculator.

16. Apparatus according to claim 15 wherein said deterioration index calculating unit further comprises:
- a comparator coupled to receive said final deterioration index calculated by said final deterioration index calculator, and compare it with a predetermined deterioration reference level; and
- a deterioration decision unit for activating an alarm when said final deterioration index is greater than said deterioration reference level.

17. Apparatus according to claim 16 wherein said instantaneous deterioration index calculator calculates said instantaneous deterioration index according to the formula:

$$\phi_i = \frac{Y_M}{X}$$

where $\Phi_i$ is the instantaneous deterioration index, $Y_M$ is a maximum value of the cross correlation function and X is the calculated autocorrelation function value.

18. Apparatus according to claim 17 wherein said final deterioration index calculator determines said final deterioration index based on a predetermined number of instantaneous deterioration index values having greatest magnitude.

19. Apparatus according to claim 2 further comprising:
- a correction factor calculator for determining a correction factor to adjust said deterioration index to compensate for deviations due to variation of intake air quantity of said engine and a cycling frequency of an output of said downstream air-fuel ratio sensor.

20. Apparatus according to claim 19 wherein said correction factor calculator comprises:
- means for periodically sensing and sampling a volume of intake air which flows into said engine;
- means for periodically sensing and sampling a cycling frequency of the output signal from said first air-fuel ratio detector;
- a look up table having stored therein predetermined correction factors to compensate said deterioration index in response to variations of intake air quantity and cycling frequency of said first air-fuel ratio sensor; and a reader for periodically reading a correction factor from said look up table based on said sampled intake air volume and cycling frequency, and providing said correction factor to said deterioration index calculating unit.

21. Apparatus according to claim 20 wherein said downstream air-fuel ratio control unit comprises:
  an output decision unit for determining when the output signal from the second air-fuel ratio sensor varies within predetermined limits proximate to a stoichiometric mixture;
  a lean-rich decision unit for determining whether said output signal from the second air-fuel ratio sensor varies on a rich side or a lean side of said predetermined limits; and
  an air fuel ratio shift coefficient calculator coupled to receive an output from said lean-rich decision unit and generate a fuel ratio adjustment signal in response thereto, which signal input to said fuel input control system.

22. Apparatus according to claim 8 further comprising:
  a comparator for comparing a result of said autocorrelation function with a predetermined sensor deterioration reference; and
  an output unit activated when said result is less than said sensor deterioration reference to indicate a deteriorated state of said first air-fuel ratio sensor.

23. Apparatus according to claim 15 further comprising:
  a comparator for comparing a result of said autocorrelation function with a predetermined sensor deterioration reference; and
  an output unit activated when said result is less than said sensor deterioration reference to indicate a deteriorated state of said first air-fuel ratio sensor.

24. Apparatus according to claim 13 wherein said correction factor calculator comprises:
  means for periodically sensing and sampling volume of intake air which flows into said engine;
  a differential filter coupled to receive an output signal from said first air-fuel ratio sensor;
  a slope calculator for determining a slope of said output signal from said first air-fuel ratio sensor based on an output from said differential filter;
  a look up table having stored therein predetermined correction factors to compensate said deterioration index in response to variations in of intake air volume and said slope; and
  a reader for periodically reading a correction factor from said look up table based on said sampled intake air volume and said slope, and providing said correction factor to said deterioration index calculating unit.

25. Method of detecting deterioration of a catalytic converter of an internal combustion engine having a fuel input control system and first and second air-fuel ratio sensors arranged upstream and downstream of said catalytic converter respectively, said method comprising the steps of:
  first sensing at least one operating parameter of said engine and providing at least one output signal indicative thereof;
  second detecting when said at least one output signal falls within a predetermined diagnostic area and generating an enabling signal indicative thereof;
  third, during time when said enabling signal is being generated, detecting when an output signal from said second air-fuel ratio sensor falls outside a predetermined range, and adjusting said fuel input control system to shift said output signal of said second air-fuel ratio sensor into said predetermined range;
  fourth, when said output signal of said second air-fuel ratio sensor is within said predetermined range, calculating a deterioration index for said catalytic converter based on output signals of said first and second air-fuel sensors.

26. Method according to claim 25 wherein said third step comprises:
  detecting when said output signal from said second air-fuel ratio sensor varies within predetermined limits proximate to a stoichiometric mixture;
  when said output signal from second air-fuel ratio sensor is not within said predetermined range, determining whether it varies on a rich side or a lean side of said predetermined limits; and
  generating a fuel ratio adjustment signal which causes said fuel input control system to adjust an amount of fuel input to said engine to shift said output signal from said second air-fuel ratio sensor within said predetermined limits.

27. Method according to claim 25 wherein said detecting step comprises comparing output time of a rich side of said output signal of said second air-fuel ratio sensor with output time of a lean side thereof.

28. Method according to claim 25 wherein said fourth steps comprises:
  calculating a cross correlation function of said output signals of said first and second air-fuel ratio sensors and an autocorrelation function of said output of said first air-fuel ratio sensor;
  periodically calculating an instantaneous deterioration index based on results of said cross correlation and autocorrelation function calculations; and
  periodically calculating a final deterioration index equal to a mean value of instantaneous deterioration index values.

29. Method according to claim 27 further comprising:
  comparing said final deterioration index with a predetermined deterioration reference level, and
  activating an output indication when said deterioration index is greater than said deterioration reference level.

30. Apparatus according to claim 29 wherein said step of calculating an instantaneous deterioration index is performed according to the following formula:

$$\phi_i = \frac{Y_M}{X}$$

where $\Phi_i$ is the instantaneous deterioration index, $Y_M$ is a maximum value of the cross correlation function and X is the calculated autocorrelation function value.

31. Method according to claim 28 wherein said step of calculating a final deterioration index comprises determining a mean value of a predetermined number of instantaneous deterioration index values having greatest magnitude.

32. Method according to claim 25 further comprising the steps of:
  determining a correction factor to adjust said deterioration index to compensate for deviations due to variation of intake air quantity of said engine and variation a cycling frequency of the output signal from the second air-fuel ratio sensor; and combining said correction factor with said deterioration index.

33. Method according to claim 32 wherein said step of determining a correction factor comprises:

periodically sensing and sampling a cycling frequency of said output signal of said first air-fuel ratio detector;

periodically sensing and sampling a volume of intake air which flows into said engine;

periodically reading a correction factor from a look up table having predetermined correction factors stored therein, based on sampled values of cycling frequency and intake air volume.

* * * * *